United States Patent
Atwater et al.

(10) Patent No.: US 10,948,170 B1
(45) Date of Patent: Mar. 16, 2021

(54) PORTABLE SOCIAL DISTANCING DEVICES AND APPLICATIONS THEREOF

(71) Applicant: IDEAL INDUSTRIES LIGHTING LLC, Sycamore, IL (US)

(72) Inventors: Craig Atwater, Wake Forest, NC (US); Nathan R. Snell, Raleigh, NC (US); Matthew Deese, Raleigh, NC (US); Kurt Schreib, Waukesha, WI (US); Moxuan Zhu, Cary, NC (US); Randy Bernard, Durham, NC (US); Bradley Scott Thomas, Cary, NC (US); Corey Goldstein, Milwaukee, WI (US); Rachel Bowman, Franklin, WI (US)

(73) Assignee: IDEAL Industries Lighting LLC, Durham, NC (US)

( * ) Notice: Subject to any disclaimer, the term of this patent is extended or adjusted under 35 U.S.C. 154(b) by 0 days.

(21) Appl. No.: 16/913,674

(22) Filed: Jun. 26, 2020

(51) Int. Cl.
| | |
|---|---|
| *F21V 21/00* | (2006.01) |
| *F21V 21/08* | (2006.01) |
| *F21V 19/02* | (2006.01) |
| *F21S 9/02* | (2006.01) |
| *F21V 23/06* | (2006.01) |
| *G08B 21/02* | (2006.01) |
| *G08B 5/36* | (2006.01) |
| *A41D 13/01* | (2006.01) |
| *F21Y 115/10* | (2016.01) |
| *F21W 111/00* | (2006.01) |

(52) U.S. Cl.
CPC ............ *F21V 21/08* (2013.01); *A41D 13/01* (2013.01); *F21S 9/02* (2013.01); *F21V 19/02* (2013.01); *F21V 23/06* (2013.01); *G08B 5/36* (2013.01); *G08B 21/02* (2013.01); *F21W 2111/00* (2013.01); *F21Y 2115/10* (2016.08)

(58) Field of Classification Search
CPC .......... F21Y 21/08; F21Y 19/02; F21Y 23/06; A41D 13/01; F21S 9/02; G08B 5/36; G08B 21/02; F21W 2111/00
USPC .................. 362/103, 105, 106, 108, 553
See application file for complete search history.

(56) References Cited

U.S. PATENT DOCUMENTS

| | | | | |
|---|---|---|---|---|
| 5,359,501 A | * | 10/1994 | Stevens .................. | A41F 9/002 362/108 |
| 5,412,896 A | * | 5/1995 | Morgan ................ | A01K 97/00 359/817 |
| 6,056,412 A | * | 5/2000 | Atlee ..................... | F21L 15/14 224/660 |
| 7,568,813 B2 | * | 8/2009 | Barker .................... | F21L 4/04 362/103 |
| 2004/0246706 A1 | * | 12/2004 | Simoni ............... | A01K 27/006 362/108 |

(Continued)

*Primary Examiner* — Laura K Tso
(74) *Attorney, Agent, or Firm* — J. Clinton Wimbish; Nexsen Pruet, PLLC

(57) ABSTRACT portable social distancing devices are described herein which, in some embodiments, are wearable by a user to maintain proper social distancing in any environment. In one aspect, a portable social distancing device comprises a housing, a mounting assembly coupled to the housing, and a projection assembly comprising two or more adjustable light sources for projecting a visible perimeter a predetermined distance from the portable social distancing device. The two or more light sources, for example, can be independently adjustable along two axes.

26 Claims, 12 Drawing Sheets

(56) References Cited

U.S. PATENT DOCUMENTS

| | | | | |
|---|---|---|---|---|
| 2006/0176680 A1* | 8/2006 | Bretz | ............... | F21L 2/00 |
| | | | | 362/108 |
| 2012/0298887 A1* | 11/2012 | Stevens | ............ | G01B 11/2513 |
| | | | | 250/492.1 |
| 2013/0265788 A1* | 10/2013 | O'Maley | ............ | F21L 4/00 |
| | | | | 362/477 |
| 2013/0335950 A1* | 12/2013 | Redpath | ............ | F21L 2/00 |
| | | | | 362/103 |
| 2014/0085872 A1* | 3/2014 | Taylor | ............ | F21L 4/00 |
| | | | | 362/106 |
| 2017/0109992 A1* | 4/2017 | Lin | ............ | G08B 7/06 |
| 2018/0100646 A1* | 4/2018 | Sullivan | ............ | F21S 9/02 |

* cited by examiner

PORTABLE SOCIAL DISTANCING DEVICES AND APPLICATIONS THEREOF

FIELD

The present application relates to devices for assisting proper social distancing and, in particular, to wearable devices operable to project a visible perimeter partially or fully surrounding the device user.

BACKGROUND

With the development and outbreak of infectious respiratory diseases, such as severe acute respiratory syndrome (SARS) and COVID-19, proper social distancing has become critically important. However, public spaces are often crowded, rendering it difficult for people to recognize and maintain proper social distancing. Efforts to assist maintenance of proper social distancing have largely centered on floor markings and/or various physical barriers for directing people, such as customers in a store, to observe a minimum distance from others. While effective in some circumstances, these measures have several disadvantages. Floor markings and physical barriers are static in nature and, therefore, are only useful over a small areal footprint. Moreover, these measures have found limited application, generally only being employed in locations where lines form, such as stores, restaurants, and airport terminals. In view of these disadvantages, new solutions for directing and/or maintaining proper social distancing are needed.

SUMMARY

In view of the foregoing, portable social distancing devices are described herein which, in some embodiments, are wearable by a user to maintain proper social distancing in any environment. In one aspect, a portable social distancing device comprises a housing, a mounting assembly coupled to the housing, and a projection assembly comprising two or more adjustable light sources for projecting a visible perimeter a predetermined distance from the portable social distancing device. The two or more light sources, for example, can be independently adjustable along two axes.

In another aspect, a portable social distancing device comprises a plurality of visible perimeter projection units, the visible perimeter projection unit comprising a housing, a mounting assembly coupled the housing, and a projection assembly comprising two or more adjustable light sources for projecting an individual visible perimeter a predetermined distance from the portable social distancing device. The individual visible perimeters projected by the plurality of projection units form a composite visible perimeter extending radially around the portable social distancing device.

Portable social distancing devices described herein can be worn by a user, wherein the visible perimeter projected by the device partially or fully extends around the user at the predetermined distance. The predetermined distance can be any desired distance, but is generally set to a distance recommended by medical personnel and/or infectious disease professionals for slowing or precluding disease transmission between individuals. In some embodiments, for example, the predetermined distance can be at least six (6) feet. The visible perimeter defines a zone around the user that other individuals should not enter if proper social distancing is to be maintained. In some embodiments, social distancing devices can be mounted to a workspace or permanent structure to define a prescribed safety zone via the projected visible perimeter. The social distancing unit may also be coupled to mobile equipment, such as a wheelchair, to create an alert zone.

In another aspect, methods of social distancing are described herein. In some embodiments, a method comprises coupling at least one visible perimeter projection unit to an article of clothing or accessory of a user, the visible perimeter projection unit comprising a housing, and a projection assembly comprising two or more adjustable light sources for projecting the visible perimeter around at least portion of the user. The two or more light sources are adjusted to project the visible perimeter at a predetermined distance.

These and other embodiments are further described in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Portable Social Distancing Devices

In one aspect, a portable social distancing device comprises a housing, a mounting assembly coupled to the housing, and a projection assembly comprising two or more adjustable light sources for projecting a visible perimeter a predetermined distance from the portable social distancing device.

Figure 8:
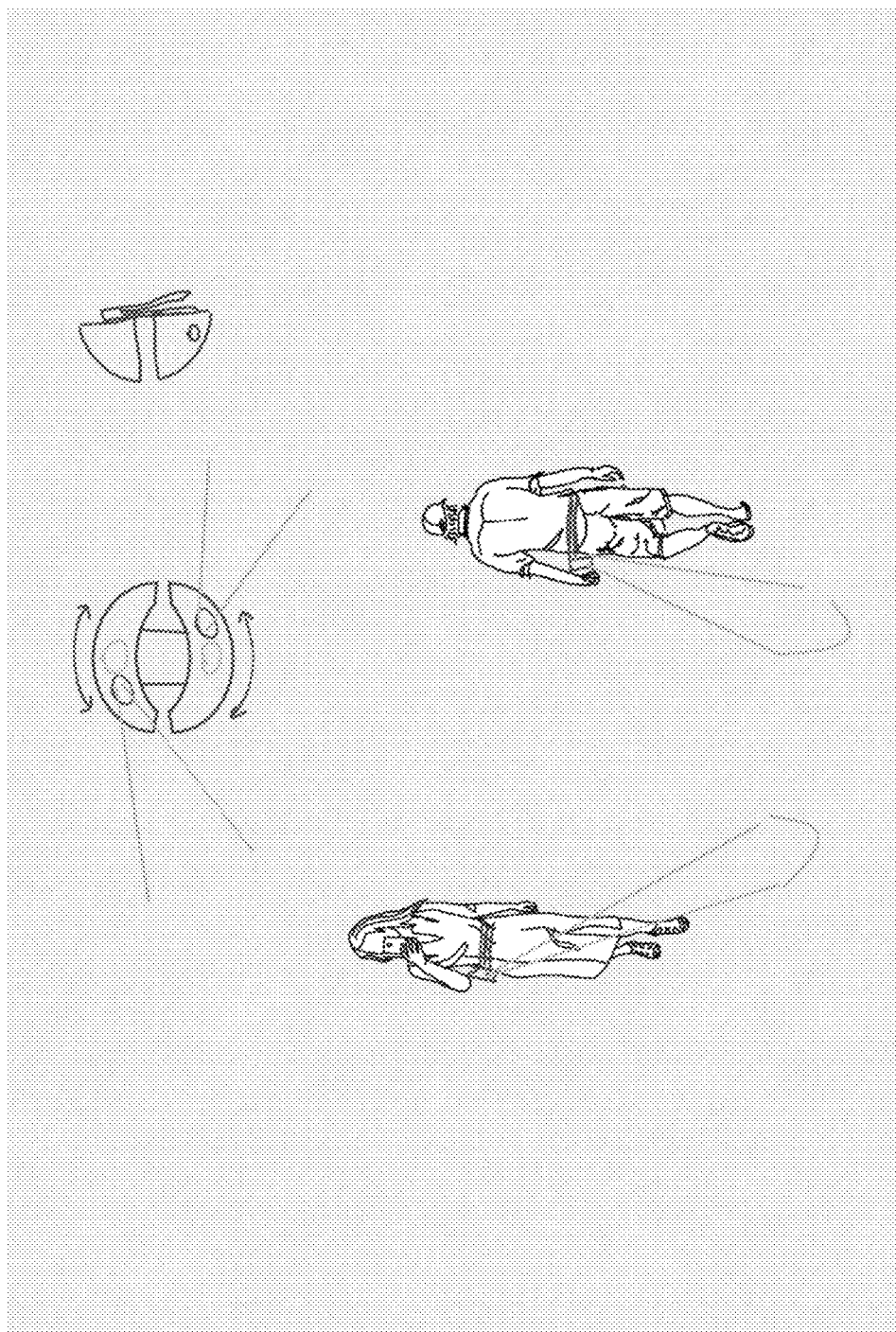
FIG. 8 illustrates use of a social distancing device, according to some embodiments.

Turning now to specific components, the two or more adjustable light sources of the projection assembly can comprise any light source not inconsistent with the technical objectives described herein. The light sources, for example, require sufficient intensity for projecting the visible perimeter on the ground at the predetermined distance. The light sources, in some embodiments, are lasers or light emitting diodes (LEDs) having emission in the visible region of the electromagnetic spectrum. The light sources can be any desired color. In some embodiments, the two or more adjustable light sources are the same color. Alternatively, the light sources may be of different color. Coloring of the light sources may be employed to convey information to the user and/or individuals in the vicinity of the user. For example, a light source projecting the visible perimeter in a direction the user is walking may be red to signify to individuals that the user is approaching. Similarly, a light source projecting the visible perimeter in a direction trailing the user may be green to signify to individuals that the user is walking away. FIG. 8 illustrates use of a social distancing device, according to some embodiments. In FIG. 8, the social distancing device is coupled to a belt or strap for projecting the visible perimeter in front and behind the user. The social distancing device is mounted on the side of the user.

Projection faces of the two or more light sources may be set to any angle relative to one another. Specific angular values can be selected according to several consideration including the desired radial coverage of the visible perimeter and the number of light sources. In some embodiments, projection faces of the two or more light sources are separated by at least 90 degrees, such as 90-180 degrees. When separated by 180 degrees, for example, a first light source projects the visible perimeter in front of the user, while the second light source projects the visible perimeter behind the user.

Figure 10A:
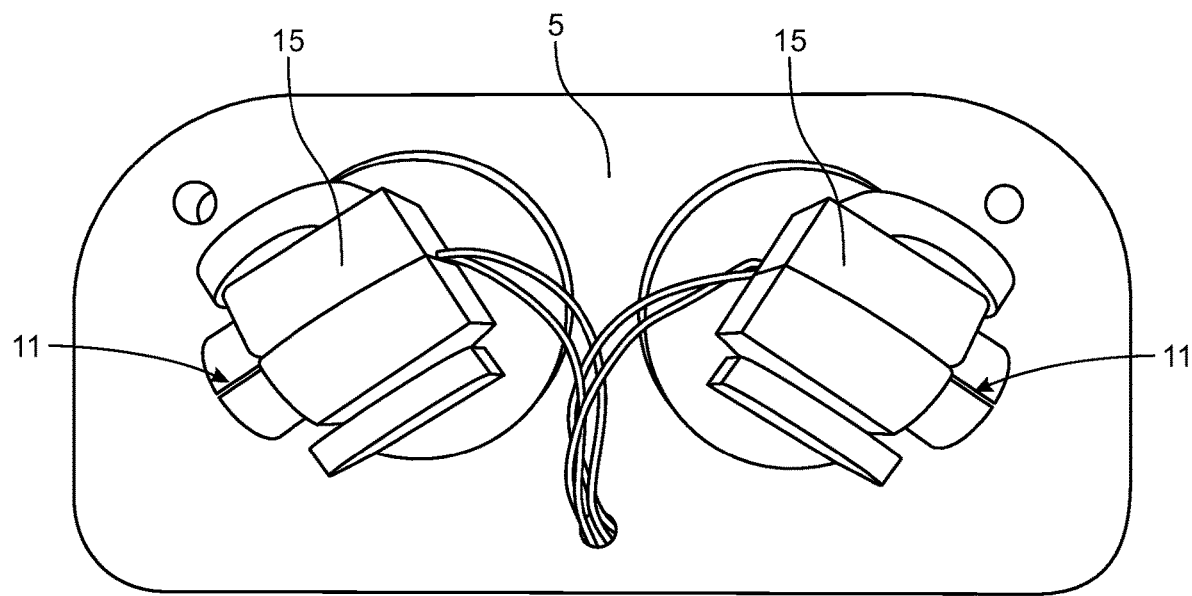
FIG. 10A illustrates adjustable laser light sources mounted to a laser frame, according to some embodiments.
Figure 10B:
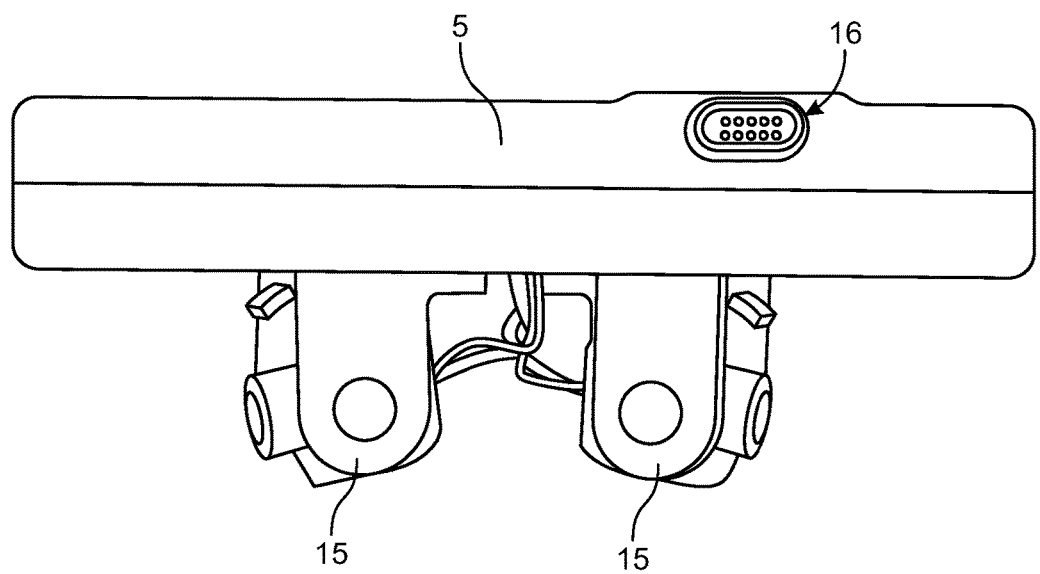
FIG. 10B is a bottom view of FIG. 10A illustrating the adjustable laser light sources and magnetic battery charging port, according to some embodiments.
Figure 12:
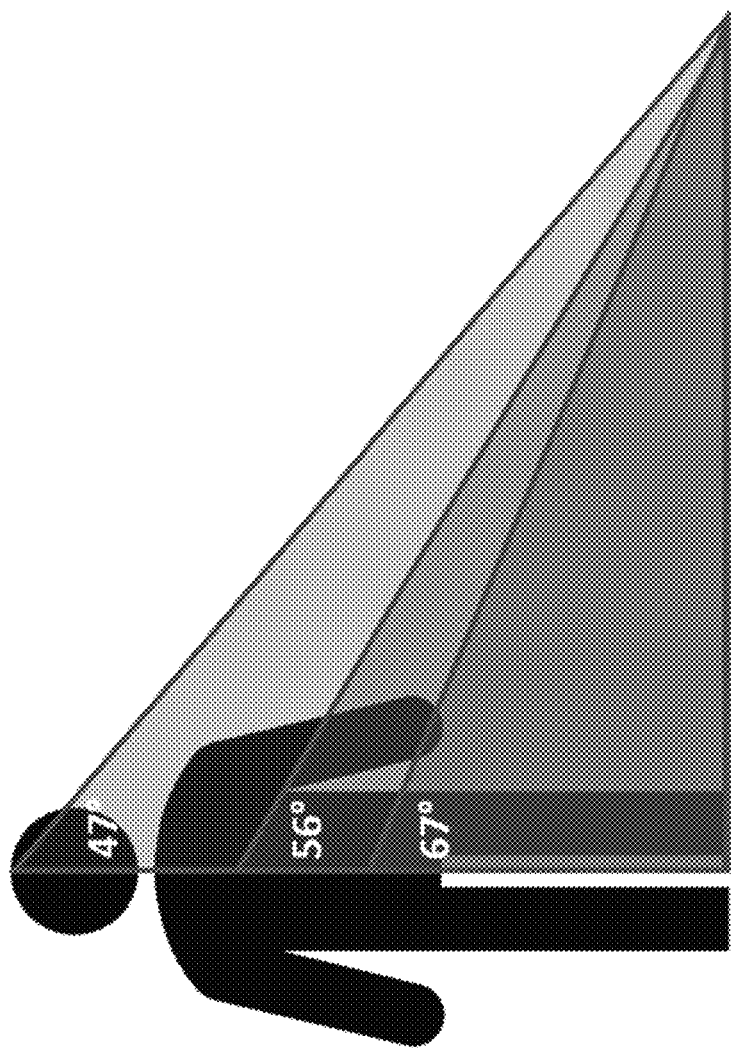
FIG. 12 illustrates variances in angles of projection according to height or elevational position of the social distancing device, according to some embodiments.

The two or more light sources are adjustable to project the visible perimeter on the ground at the desired predetermined distance. As described herein, the portable social distancing device is wearable by a user. The portable social distancing device, for example, can be coupled to a belt, waist, collar, necklace, headgear, or badge of the user. In other embodiments, the portable social distancing device may be coupled to the surface of a workspace. The portable social distancing device, in some embodiments, is mounted on mobile equipment, table mounted or stand mounted. Accordingly, distance of the portable social distancing device to the ground will vary depending on user and application. Adjustability of the light sources enables the light sources address these height variations and project the visible perimeter at the desired predetermined distance. FIG. 12 illustrates variances in angles of projection according to height or elevational position of the social distancing device, according to some embodiments. In some embodiments, the predetermined distance is a function of height or elevational position of the device and orientation of the two or more adjustable light sources. Therefore, portable devices described herein can further comprise a calibration chart of the predetermined distance relative to elevational position of the device and orientation of the adjustable light sources. The calibration chart, in some embodiments, is encoded in software run by the device. In such embodiments, the device can employ architecture to determine elevational position and automatically adjust the light sources to the proper position based on the desired predetermined distance. Alternatively, the calibration chart may be in a format readable by the user when using the device. The user, for example, sets the elevational position/height of the device during use, and then consult the calibration chart for adjusting the light sources to the proper position for projecting the visible perimeter on the ground at the desired predetermined distance. In some embodiments, the adjustment mechanism of the light sources can include mechanical stops, gears or slots for placing the light sources in different orientations. In other embodiments, the adjustment mechanism can be continuous, without mechanical stops, gears or slots. Additionally, in some embodiments, the light sources are independently adjustable. In such embodiments, the predetermined distance to project the visible perimeter may be the same or different between the light sources. In other embodiments, the light sources are not independently adjustable to ensure the projection distance of the visible perimeter is the same for each light source. FIG. 10A illustrates adjustable laser light sources 11 mounted to a laser frame 15. The laser frames 15 are coupled to a laser mount 5. FIG. 10B is a bottom view of FIG. 10A illustrating the adjustable laser light sources and magnetic battery charging port 16, according to some embodiments.

Figure 13B:
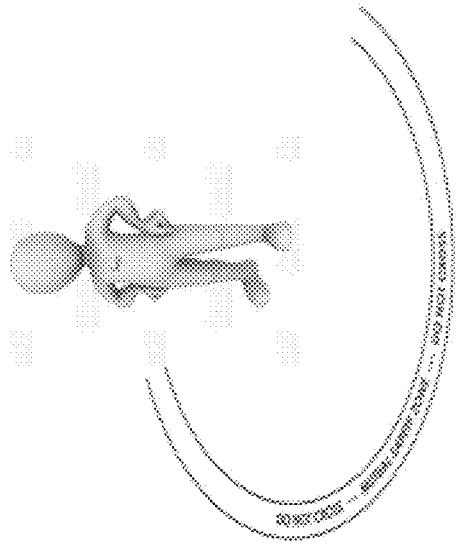
FIGS. 13A and 13B illustrates various embodiments of the projected visible perimeter and infill.
Figure 13A:
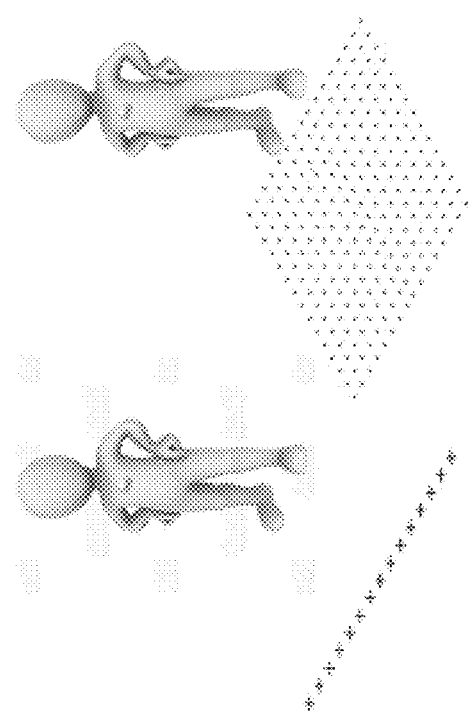

As described herein, the visible perimeter can extend radially around the device and, concomitantly, around the user. In some embodiments, the visible perimeter has a radial extension of up to 180 degrees. Moreover, the portable social distancing device may further comprise one or more optical elements associated with the two or more light sources. The optical elements can have various functions including, but not limited to, providing patterns to the visible perimeter and/or participating in setting the predetermined projection distance of the visible perimeter. One or more optical elements can determine the shape and pattern of the visible perimeter. In some embodiments, the visible perimeter is a solid line. In other embodiments, the visible perimeter is a dotted or dashed line. Optical elements may also be employed to provide images and/or words as part of or associated with the visible perimeter. In further embodiments, one or more optical elements may provide infill for the spatial zone between the user and visible perimeter. Infill can have any desired pattern or no pattern. In some embodiments, the infill may be lines, dots or combinations thereof. The infill can draw additional attention for maintaining proper social distancing. FIGS. 13A and 13B illustrates various embodiments of the projected visible perimeter and infill. Suitable optical elements may be refractive, diffractive, or combinations thereof.

Figure 9A:
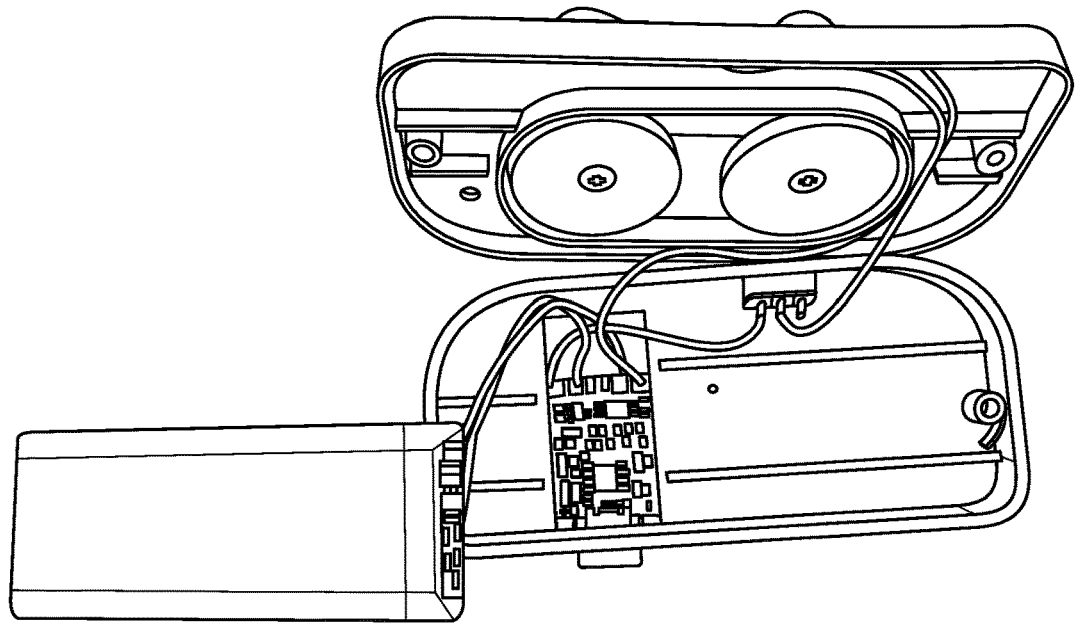
FIGS. 9A and 9B illustrate incorporation of the battery into the housing of the social distancing device of FIG. 1, according to some embodiments.
Figure 9B:
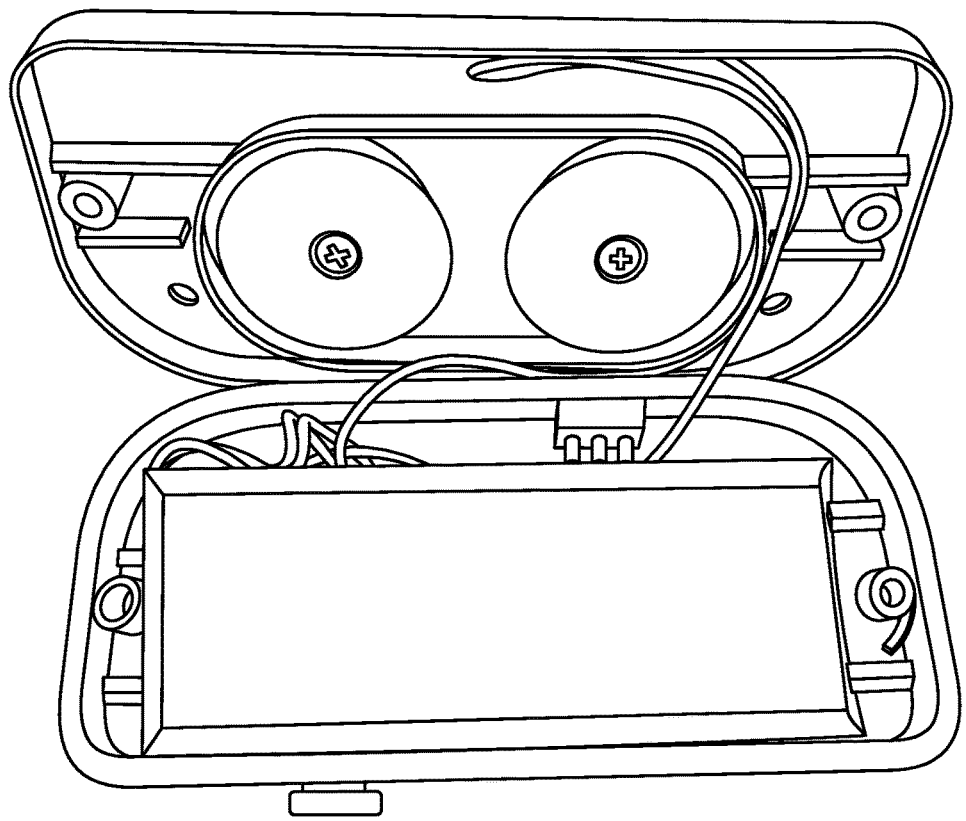
Figure 11A:
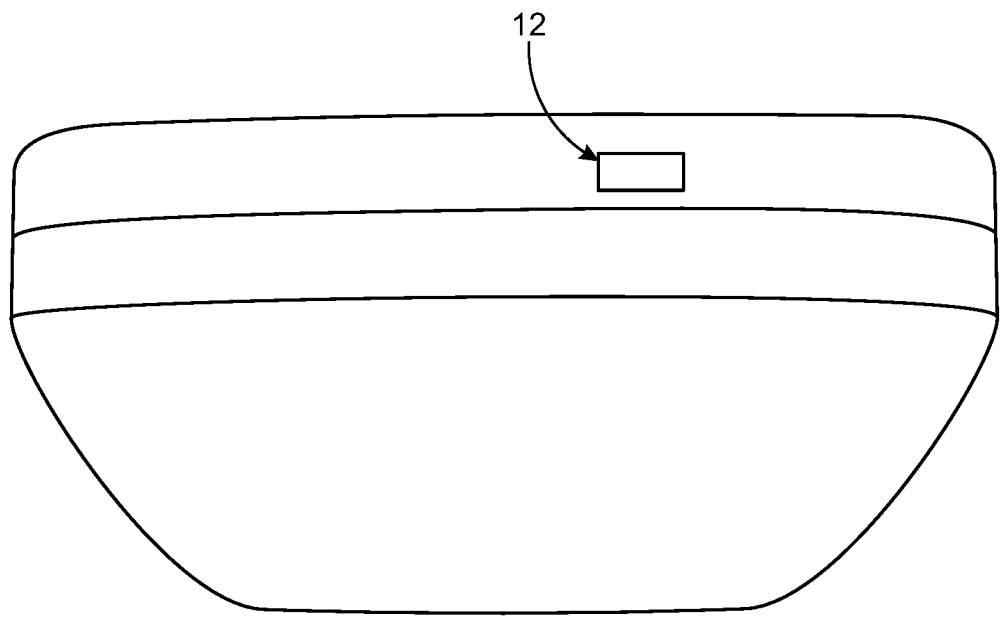
FIG. 11A illustrates a top view of a social distancing device, according to some embodiments.
Figure 11B:
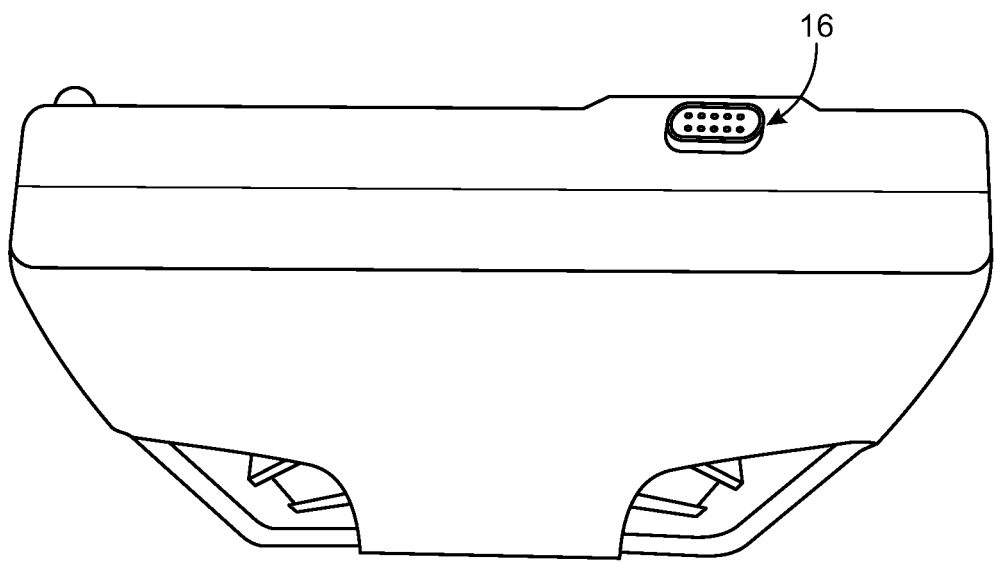
FIG. 11B illustrates a bottom view of a social distancing device, according to some embodiments.

The projection assembly can be partially or fully positioned with the housing of the social distancing device. The housing can include one or more apertures in which the light sources reside and/or pass the projected visible perimeter from the device. The apertures may also permit access to the light sources for adjustment, in some embodiments. In other embodiments, adjustment mechanisms for the light sources may have one or more interfaces on the housing exterior to facilitate actuation by the user. A battery may be positioned in the housing for powering the light sources. In some embodiments, the battery is rechargeable, and one or more recharging ports are positioned in the wall of the housing. The charging port can be USB compatible or have other desired structure. In some embodiments, the rechargeable battery can operate the device for up to 14 hours before requiring recharging. In other embodiments, the housing can comprise a panel for accessing the battery for replacement. A power switch can also be integrated into the housing. FIGS. 9A and 9B illustrate incorporation of the battery into the housing of the social distancing device, according to some embodiments. Additionally, FIG. 11A illustrates a top view of a social distancing device, according to some embodiments. In the embodiment of FIG. 11A, the power switch 12 is located on the top of the housing. The power switch may be located in other areas, including the side or bottom of the device. FIG. 11B illustrates a bottom view of a social distancing device, according to some embodiments. The battery charging port 16 resides in the housing bottom, but can reside in other areas of the housing.

In some embodiments, intensity of the projected visible perimeter can vary according to environment. In brighter environments, such as daylight or well-lighted spaces, the light sources can increase brightness or intensity of the visible perimeter. In low lighting conditions, the light sources can dim the visible perimeter. Brightness or intensity adjustments may be administered manually or automatically via an "auto" setting where a photosensor governs power to the light sources. In this way, battery life can be efficiently managed.

The portable social distancing device also comprises a mounting assembly coupled to the housing. The mounting assembly can couple the portable social distancing device to an article of clothing or accessory of the user. Alternatively, the mounting assembly can couple the portable device to a surface of a user workstation. In such embodiments, the portable device can maintain proper social distancing in various tightly spaced work environments, such as assembly lines, trading floor and call centers. The mounting assembly can comprise any desired features for coupling the social distancing device to the user or workstation. In some embodiments, the mounting assembly comprises a clip or apertures for receiving a strap or other clothing article. Apertures of the mounting assembly may also have dimensions for receiving screws or bolts when fastening the social distancing device to a workplace surface.

Figure 1:
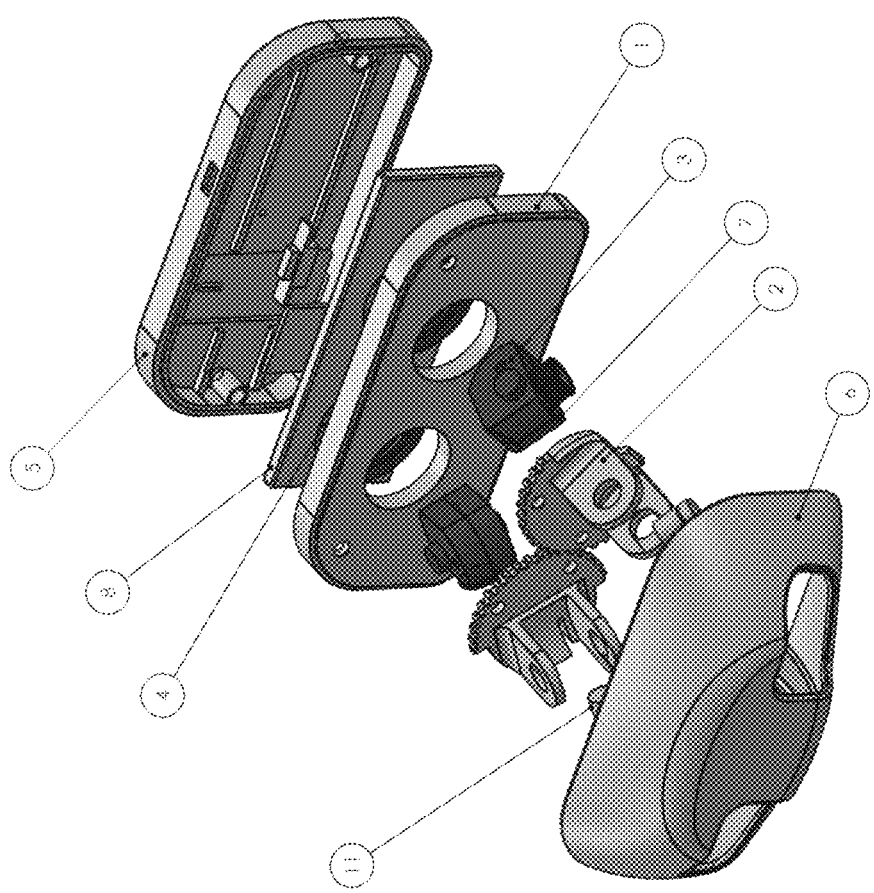
FIG. 1 illustrates an exploded view of a portable social distancing device according to some embodiments described herein.

FIG. 1 illustrates an exploded view of a portable social distancing device according to some embodiments described herein. Table I provides a legend for the components of the portable social distancing device.

TABLE I

Device Components

| Number | Component |
|---|---|
| 1 | Laser Mount |
| 2 | Laser Fork |
| 3 | Laser Frame (Right) |
| 4 | Laser Cap |
| 5 | Laser Mount |
| 6 | Front Housing Cover |
| 7 | Laser Frame (Left)_ |
| 8 | Battery |
| 11 | Laser |

Figure 2:
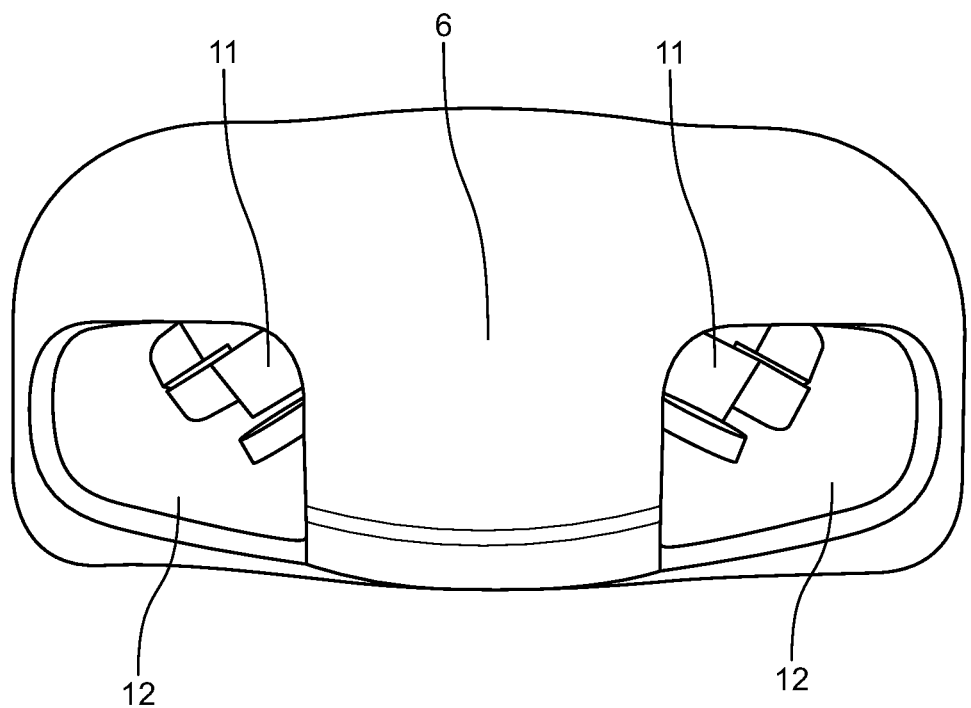
FIG. 2 is a front view of the assembled portable social distancing device illustrated in FIG. 1.
Figure 3:
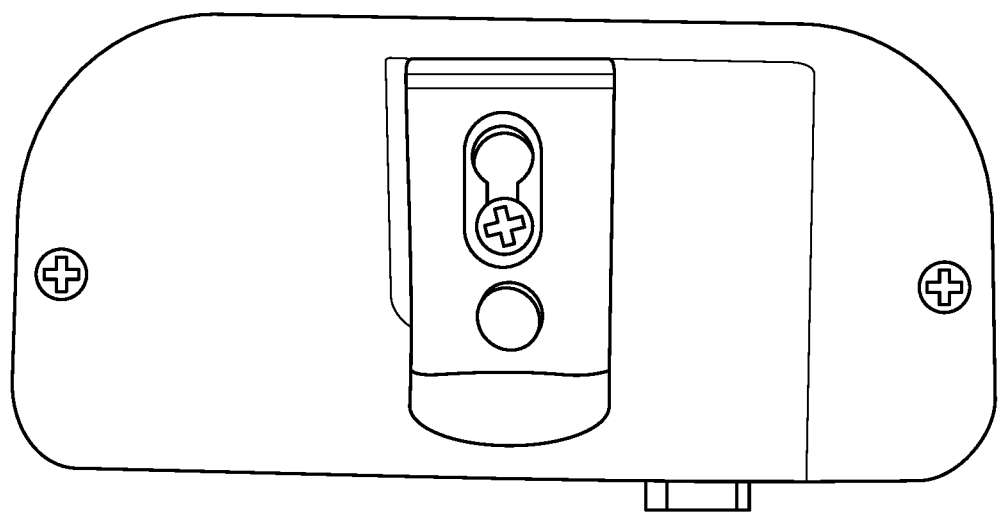
FIG. 3 is a back view of the of the assembled portable social distancing device illustrated in FIG. 1.

FIG. 2 is a front view of the assembled portable social distancing device illustrated in FIG. 1. As shown in FIG. 2, the adjustable laser light sources 11 reside in apertures 12 of the front housing cover 6. FIG. 3 is a back view of the of the assembled portable social distancing device illustrated in FIG. 1. A clip is coupled to the housing and serves as the mounting assembly.

When clipped to an article of clothing, such as a belt or purse, of the user, the lasers 11 are operable to project a visible perimeter on the ground in front of and behind the user. In some embodiments, the lasers 11 are independently operable, and the user can select whether to project the visible perimeter in a single or both directions. Additionally, independently operable light sources may be employed to indicate directional movement of the user. In some embodiments, only the light source facing directional movement of the user is illuminated. The social distancing device, for example, can comprise an accelerometer and/or other movement sensing equipment to ascertain directional movement of the user and activate the appropriate light source.

Figure 4:
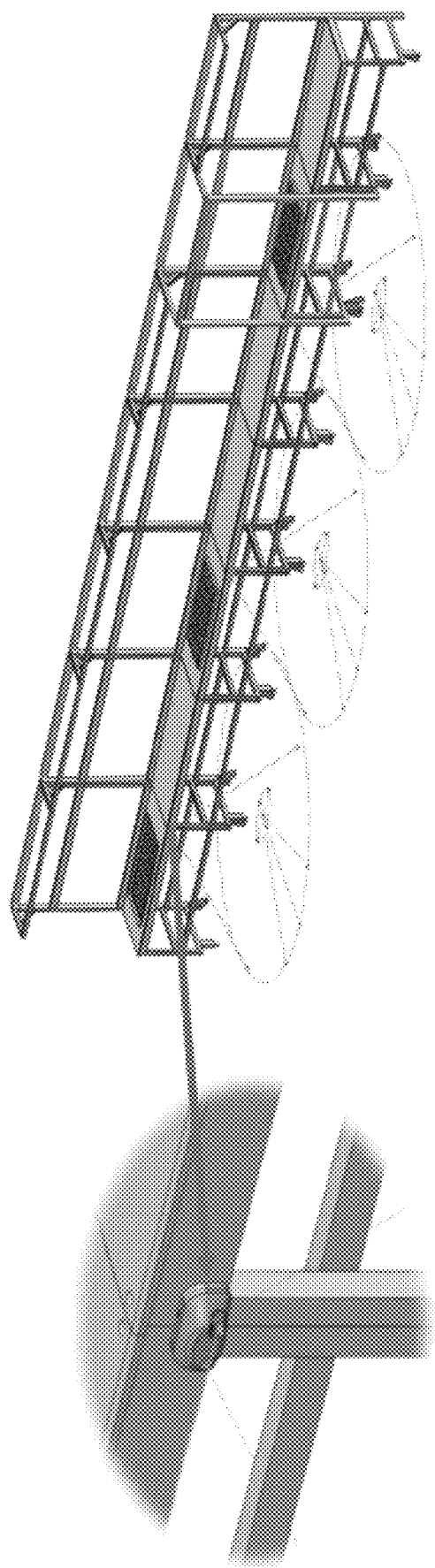
FIG. 4 illustrates coupling the portable social distancing devices of FIG. 1 to an assembly line, according to some embodiments.

FIG. 4 illustrates coupling the portable social distancing devices of FIG. 1 to an assembly line, according to some embodiments. As illustrated in FIG. 4, the devices 11 project a visible perimeter 14 for maintaining proper worker spacing/distancing on the assembly line 10.

Figure 7:
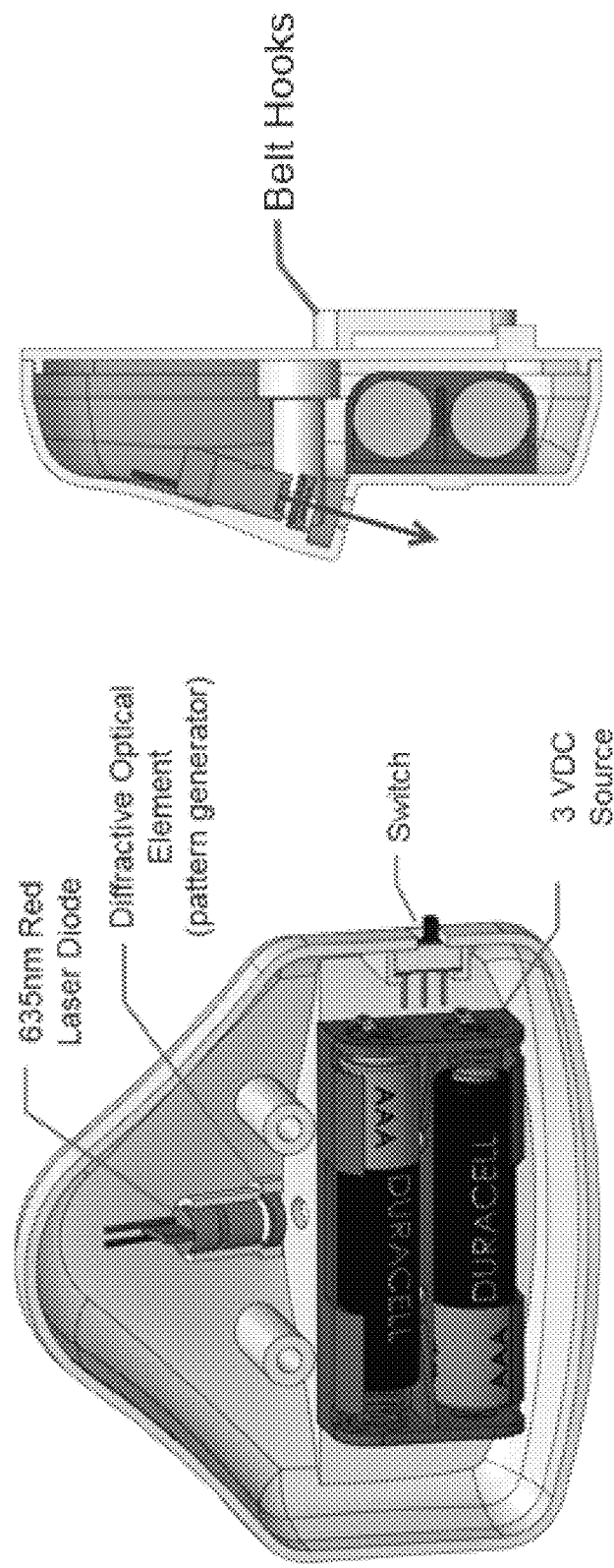
FIG. 7 illustrates a non-limiting embodiment of a social distancing device described herein comprising a single fixed lighting source for projecting a visible perimeter a predetermined distance from the portable social distancing device.

In some embodiments, the portable social distancing device includes a single adjustable light source. In such embodiments, the device can project the visible perimeter in a forward direction and be rotated 180 degrees to project in the reverse direction. Rotation to project in a different direction may also require repositioning the adjustable light source. Additionally, in some embodiments, the single light source is fixed and, therefore, is not adjustable. A calibration chart can be employed to mount the fixed light source at the correct height for achieving the desired visible perimeter distance. FIG. 7 illustrates a non-limiting embodiment of a social distancing device described herein comprising a single fixed lighting source for projecting a visible perimeter a predetermined distance from the portable social distancing device.

In another aspect, a portable social distancing device comprises a plurality of visible perimeter projection units, the visible perimeter projection unit comprising a housing, a mounting assembly coupled the housing, and a projection assembly comprising two or more adjustable light sources for projecting an individual visible perimeter a predetermined distance from the portable social distancing device. The individual visible perimeters projected by the projection units form a composite visible perimeter extending radially around the portable social distancing device.

Figure 5:
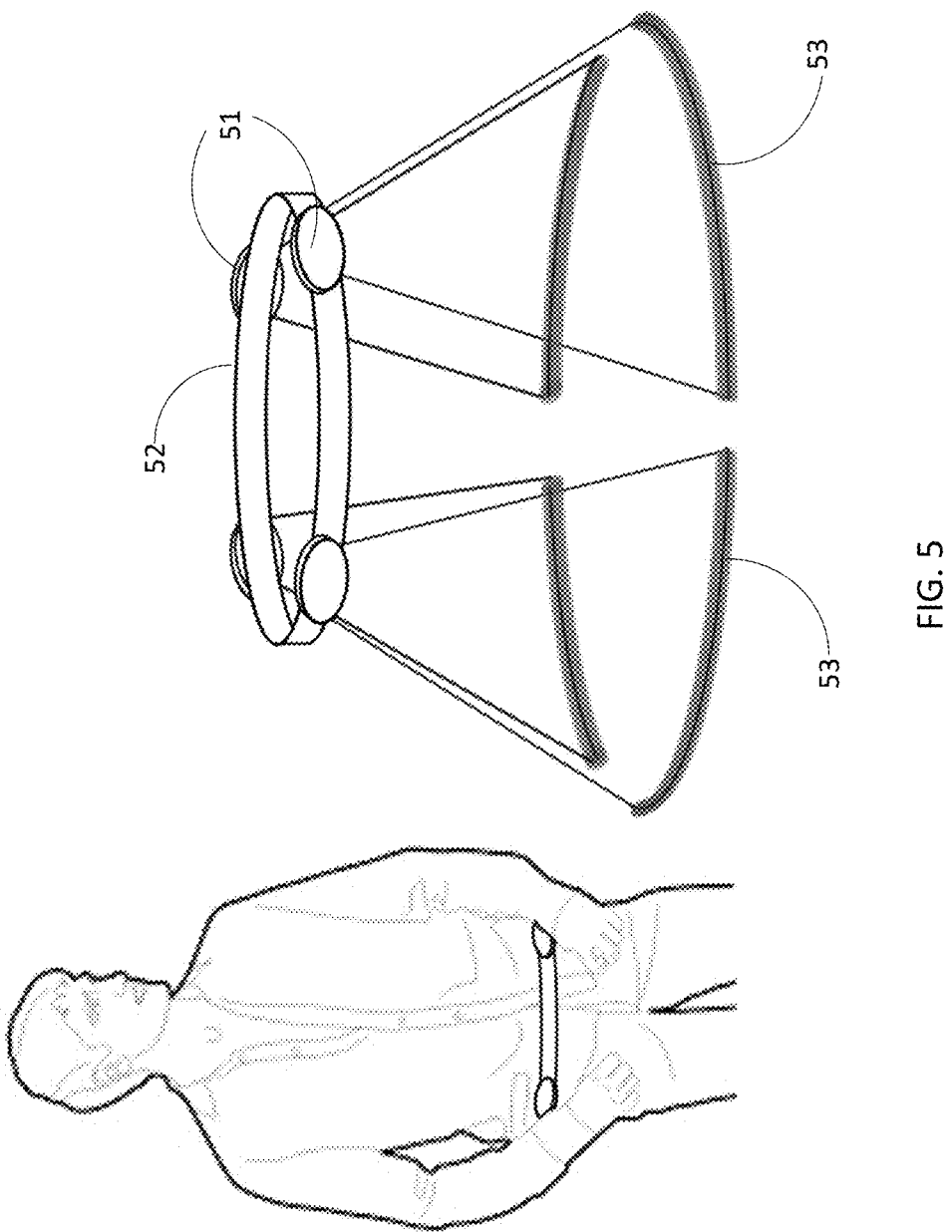
FIG. 5 illustrates a portable social distancing device comprising a plurality of visible perimeter projection units, according to some embodiments.

FIG. 5 illustrates a portable social distancing device comprises a plurality of visible perimeter projection units, according to some embodiments. In the embodiment of FIG. 5, the visible perimeter projection units 51 are coupled to a common support 52, such as an article of clothing of the user, including a strap or belt. The visible perimeter projection units 51 can have any construction and/or properties described herein including, but not limited to, the design and structural features depicted in FIGS. 1-3. The individual visible perimeters 53 projected by the plurality of visible perimeter projection units 51 form a composite visible perimeter 54 on the ground and extending radially around the portable social distancing device, and concomitantly around the user. The composite visible perimeter can have any desired radial extension, depending on the number of visible perimeter projection units employed in the device. In some embodiments, the composite visible perimeter can have a radial extension of 180 to 360 degrees. The four visible perimeter projection units 51 of FIG. 5, for example, form a composite visible perimeter 54 having a radial extension approaching 360 degrees.

Figure 6:
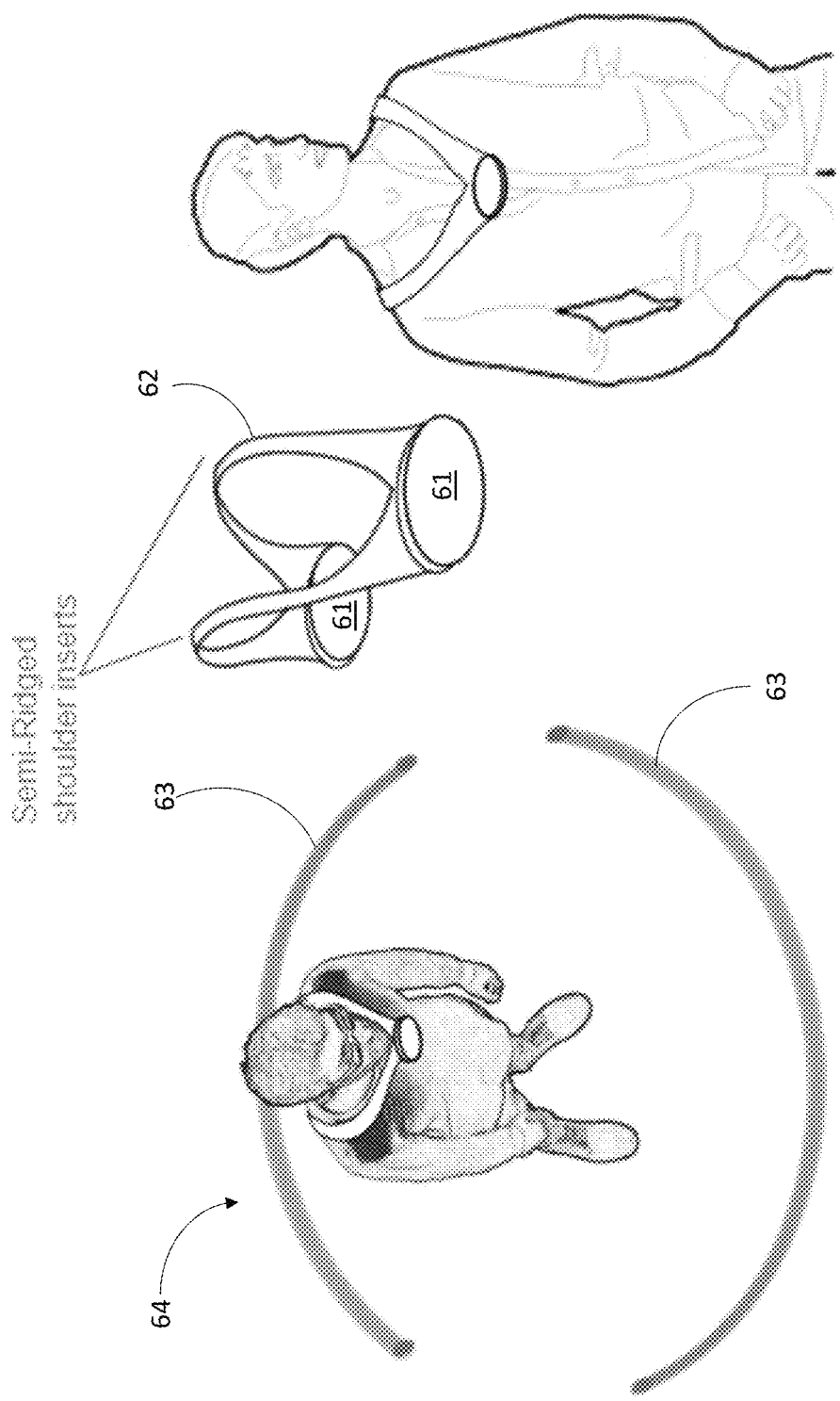
FIG. 6 illustrates a portable social distancing device comprising a plurality of visible perimeter projection units, according to some embodiments.

FIG. 6 illustrates a portable social distancing device comprising a plurality of visible perimeter projection units, according to some embodiments. In the embodiment of FIG. 6, two visible perimeter projection units 61 are coupled to a common strap 62 for resting on the shoulders of a user. The strap 62 orients the projection units 61 on the front and back of the user. The composite visible perimeter 64 formed by the individual visible perimeters 63 projected by the visible perimeter projection units 61 exhibits a radial extension nearing 360 degrees.

III. Methods of Social Distancing

In another aspect, methods of social distancing are described herein. In some embodiments, a method comprises coupling at least one visible perimeter projection unit to an article of clothing or accessory of a user, the visible perimeter projection unit comprising a housing, and a projection assembly comprising two or more adjustable light sources for projecting the visible perimeter around at least portion of the user. The two or more light sources are adjusted to project the visible perimeter at a predetermined distance. Social distancing devices for use in methods described herein can have any design, structure, properties, and/or functionalities provided in Section I hereinabove. In some embodiments, for example, the social distancing device comprises a single adjustable light source or a single fixed light source.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A portable social distancing device comprising:
    a housing;
    a mounting assembly coupled the housing; and
    a projection assembly comprising two or more adjustable light sources for projecting a visible perimeter a predetermined distance from the portable social distancing device, wherein the two or more light sources are independently adjustable along two axes.

2. The portable social distancing device of claim 1, wherein the predetermined distance is a function of elevational position of the device and orientation of the two or more adjustable light sources.

3. The portable social distancing device of claim 1, wherein the visible perimeter extends radially around the device.

4. The portable social distancing device of claim 3, wherein the perimeter extends radially up to 180 degrees.

5. The portable social distancing device of claim 2 further comprising a calibration chart of the predetermined distance relative to the elevational position of the device and orientation of the two or more adjustable light sources.

6. The portable social distancing device of claim 1 further comprising a power source positioned in the housing for providing electrical power to the two or more adjustable light sources.

7. The portable social distancing device of claim 1, wherein projection faces of the two or more adjustable light sources are separated by at least 90 degrees.

8. The portable social distancing device of claim 7, wherein the projection faces are separated by 90-180 degrees.

9. The portable social distancing device of claim 1, wherein the housing comprises apertures for passing light from the two or more adjustable light sources.

10. The portable social distancing device of claim 1 further comprising optical elements associated with the two or more adjustable light sources.

11. The portable social distancing device of claim 10, wherein the optical elements provide patterns to the visible perimeter.

12. The portable social distancing device of claim 10, wherein the optical elements participate in setting the predetermined distance of the visible perimeter.

13. The portable social distancing device of claim 6 further comprising a port for recharging the power source.

14. The portable social distancing device of claim 1, wherein the mounting assembly is operable to couple to an article of clothing of a user.

15. The portable social distancing device of claim 1, wherein the mounting assembly is operable to couple to one or more surfaces of a workspace.

16. The portable social distancing device of claim 1, wherein the two or more light sources are independently operable.

17. The portable social distancing device of claim 1, wherein the predetermined distance is at least 6 feet.

18. A portable social distancing device comprising:
    a plurality of visible perimeter projection units, the visible perimeter projection unit comprising a housing, a mounting assembly coupled the housing, and a projection assembly comprising two or more adjustable light sources for projecting an individual visible perimeter a predetermined distance from the portable social distancing device, wherein the two or more light sources are independently adjustable along two axes.

19. The portable social distancing device of claim 18, wherein the individual visible perimeters projected by the plurality of visible perimeter projection units form a composite visible perimeter extending radially around the portable social distancing device.

20. The portable social distancing device of claim 19 wherein the composite visible perimeter extends radially 180 to 360 degrees.

21. The portable social distancing device of claim 18, wherein the predetermined distance is uniform over the plurality of visible perimeter projection units.

22. The portable social distancing device of claim 18, wherein the predetermined distance varies between the plurality of visible perimeter projection units.

23. The portable social distancing device of claim 18, wherein the visible perimeter projection units are mounted to a common support.

24. The portable social distancing device of claim 23, wherein the common support is an article of clothing of a user.

25. The portable social distancing device of claim 23, wherein the common support is a workspace of a user.

26. The portable social distancing device of claim 18, wherein the visible perimeter projection units are independently operable.

* * * * *